US008417962B2

(12) United States Patent
Novak et al.

(10) Patent No.: US 8,417,962 B2
(45) Date of Patent: Apr. 9, 2013

(54) DEVICE BOOTING WITH AN INITIAL PROTECTION COMPONENT

(75) Inventors: Mark F. Novak, Newcastle, WA (US);
Robert Karl Spiger, Seattle, WA (US);
Stefan Thom, Snohomish, WA (US);
David J. Linsley, Seattle, WA (US);
Scott A. Field, Redmond, WA (US);
Anil Francis Thomas, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 354 days.

(21) Appl. No.: 12/813,955

(22) Filed: Jun. 11, 2010

(65) Prior Publication Data
US 2011/0307711 A1  Dec. 15, 2011

(51) Int. Cl.
G06F 11/30  (2006.01)
G06F 12/14  (2006.01)
(52) U.S. Cl. ....................................................... 713/188
(58) Field of Classification Search .................... 713/188
See application file for complete search history.

(56) References Cited

U.S. PATENT DOCUMENTS

| 7,603,704 | B2 | 10/2009 | Bruening et al. |
| 7,698,507 | B2 | 4/2010 | Ghetie |
| 7,716,470 | B2 | 5/2010 | Stillerman et al. |
| 7,721,341 | B2 | 5/2010 | England et al. |
| 2006/0174344 | A1 | 8/2006 | Costea et al. |
| 2008/0005797 | A1 | 1/2008 | Field et al. |
| 2008/0120499 | A1* | 5/2008 | Zimmer et al. ................. 713/2 |
| 2009/0204964 | A1* | 8/2009 | Foley et al. .................... 718/1 |
| 2009/0217378 | A1 | 8/2009 | Johnson et al. |

OTHER PUBLICATIONS

Takemori, et al., "Remote Attestation for HDD Files using Kernel Protection Mechanism", Retrieved at << http://quning.org/self/cmu_icc.pdf >>, Nov. 2009, pp. 1-6.
Kil, et al., "Remote Attestation to Dynamic System Properties: Towards Providing Complete System Integrity Evidence", Retrieved at << http://discovery.csc.ncsu.edu/pubs/DSN09.pdf. >>, in Proceedings of the 39th Annual IEEE/IFIP International Conference on Dependable Systems and Networks (DSN), Jun. - Jul. 2009, pp. 1-10.
Schellekens, et al., "Remote Attestation on Legacy Operating Systems With Trusted Platform Modules", Retrieved at << http://www.cosic.esat.kuleuven.be/publications/article-918.ps >>, Science of Computer Programming, vol. 74, No. 1-2, Dec. 2008, pp. 59-72.
Seshadri, et al., "Pioneer: Verifying Code Integrity and Enforcing Untampered Code Execution on Legacy Systems", Retrieved at << http://citeseerx.ist.psu.edu/viewdoc/download?doi=10.1.1.129.5582&rep=rep1&type=pdf. >>, ACM SIGOPS Operating Systems Review, SOSP '05, vol. 39, No. 5, Dec. 2005, p. 16.

* cited by examiner

*Primary Examiner* — Kambiz Zand
*Assistant Examiner* — Stephen Sanders
(74) *Attorney, Agent, or Firm* — Wolfe-SBMC

(57) ABSTRACT

Booting a computing device includes executing one or more firmware components followed by a boot loader component. A protection component for the computing device, such as an anti-malware program, is identified and executed as an initial component after executing the boot loader component. One or more boot components are also executed, these one or more boot components including only boot components that have been approved by the protection component. A list of boot components that have been previously approved by the protection component can also be maintained in a tamper-proof manner.

20 Claims, 5 Drawing Sheets

DEVICE BOOTING WITH AN INITIAL PROTECTION COMPONENT

BACKGROUND

Computers have become increasingly interconnected via various networks, such as the Internet. While such connectivity allows users to access a variety of different services and data, such connectivity is not without its problems. One such problem is that such connectivity can allow malicious programs to be run on these computers. These malicious programs can perform a variety of undesirable actions, such as launching attacks against other computers, sending private data to other users' computers, preventing a user from being able to use his or her computer, and so forth. For some types of malicious program, once the malicious program has been run on a computer it can be very difficult for the user to identify and remove the malicious program or even use his or her computer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a method of booting a computing device includes executing one or more firmware components. After executing the one or more firmware components, a boot loader component is executed. A protection component (e.g., an anti-malware program) for the computing device is identified, and the protection component is executed as an initial component after executing the boot loader component. One or more boot components are also executed, these one or more boot components including only boot components that have been approved for execution by the protection component.

BRIEF DESCRIPTION OF THE DRAWINGS

The same numbers are used throughout the drawings to reference like features.

DETAILED DESCRIPTION

Figure 1:
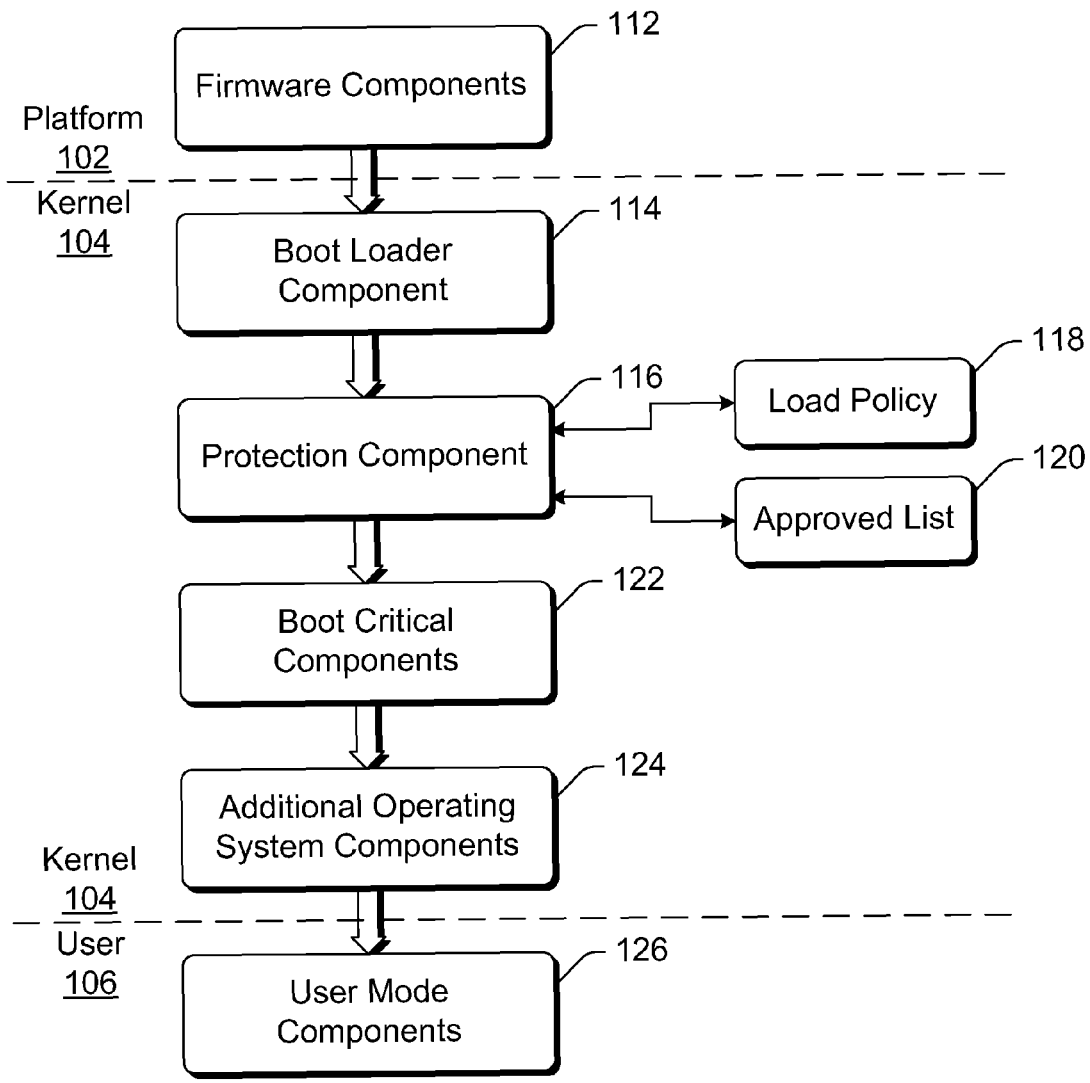
FIG. 1 illustrates an example device implementing the device booting with an initial protection component in accordance with one or more embodiments.

Device booting with an initial protection component is discussed herein. A computing device is booted following a particular ordering of components. Firmware components are executed, followed by a boot loader component of the operating system, followed by a protection component (e.g., an anti-malware program). The protection component evaluates one or more additional boot components (such as boot critical components without which the operating system cannot run) and only the boot components that are approved for execution are executed. A boot component is approved for execution only if the boot component satisfies a load policy or the boot component is on an approved list of boot components. This approved list of boot components can be stored in a manner that prevents tampering with the approved list and/or allows any tampering with the list to be detected. The protection component is executed early in the boot process, allowing the protection component to prevent known malicious programs from executing during (and after) the boot process.

References are made herein to public key cryptography and digital signatures. Although such cryptography is well-known to those skilled in the art, a brief overview of such cryptography is included here to assist the reader. In public key cryptography, an entity (such as a user, hardware or software component, a device, a domain, and so forth) has associated with it a public/private key pair. The public key can be made publicly available, but the entity keeps the private key a secret. Without the private key it is computationally very difficult to decrypt data that is encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. Any entity with the public key can use the public key to verify the digital signature by executing a suitable digital signature verification algorithm on the public key, the signature, and the data that was signed. Executing such a digital signature verification algorithm allows the entity to verify both that the data was signed by the entity in possession of the private key and that the data was not changed after being signed.

Additionally, references are made herein to hashes or hash values. Although hashes are well-known to those skilled in the art, a brief overview of such is included here to assist the reader. A hash or hash value refers to a value that is obtained by applying a hash function to an input. The hash function can be a cryptographic hash function, which is a hash function that generates a hash value that changes if there is a change to the input. Thus, a cryptographic hash function can generate hashes for a particular input at two different times, and determine that there has been no change to the input between the two different times if the hashes are the same (if the hashes are different, then the input has been changed). The hashes discussed herein are typically generated using a cryptographic hash function.

FIG. 1 illustrates an example device 100 implementing the device booting with an initial protection component in accordance with one or more embodiments. Device 100 executes various components or modules that allow device 100 to perform various operations. These components or modules include instructions and/or data that is typically stored in a nonvolatile memory or storage device (e.g., Flash memory, read only memory (ROM), magnetic disk, optical disc, remote device or storage accessed over a network, and so forth). These components or modules are loaded from the nonvolatile memory or storage device into one or more volatile memories (e.g., random access memory (RAM)) from which they are retrieved and executed by one or more processors.

When device 100 is powered on or otherwise reset, device 100 boots. Booting of device 100 refers to the beginning operation of device 100, typically loading and executing an operating system of device 100. The operating system includes numerous components or modules that are loaded and executed on device 100 (and are illustrated as, for example, components 112, 114, 116, 122, and 124 in FIG. 1). Loading of a component refers to copying the component into a volatile memory (and optionally performing additional configurations to other components or data stores). Executing a component refers to the running of (execution of) the instructions of the component by a processor of device 100. After device 100 is booted, various other programs can be run on device 100. The device booting with an initial protection component discussed herein begins executing a protection component early in the boot process, allowing malicious programs to be identified and prevented from running on device 100.

Device 100 can be a variety of different types of devices. For example, device 100 can be a desktop computer, a laptop or netbook computer, a notepad computer, a mobile station, an entertainment appliance, a set-top box communicatively coupled to a display device, a television, a cellular or other wireless phone, a game console, an automotive computer, and so forth. Thus, computing device 100 may range from a full resource device with substantial memory and processor resources (e.g., personal computers, game consoles) to a low-resource device with limited memory and/or processing resources (e.g., traditional set-top boxes, hand-held game consoles).

Device 100 employs an architecture including a platform level 102, a kernel level 104, and a user level 106. These different levels refer to different modes or security partitions of device 100, with components in a lower security level being prevented from directly accessing components in a higher security level. In device 100, platform level 102 is the highest security level, kernel level 104 is the next highest security level, and user level 106 is the lowest security level. These different levels can be implemented in a variety of different conventional manners, such as using different processor rings. Although three levels are illustrated in FIG. 1, it should be noted that different numbers of security levels can alternatively be used (e.g., four or more security levels).

During the boot process, one or more firmware components 112 are the first components loaded and executed by device 100 during the boot process. Firmware components 112 execute in platform level 102. Firmware components 112 are stored in a nonvolatile memory of device 100. Firmware components 112 can be stored in a read only memory, or alternatively in writeable nonvolatile memory (such as Flash memory). In embodiments in which one or more firmware components 112 are stored in writeable nonvolatile memory, care is typically taken to ensure that such firmware components 112 are not tampered with (and thus not altered by a malicious program). Such care can be taken, for example, by verifying a signature on the components 112 stored in writeable nonvolatile memory, storing components 112 in protected memory that is accessible only to other firmware components 112, using a variety of conventional trusted boot or secure boot techniques, and so forth.

Firmware components 112 initiate execution of a boot loader component 114. Boot loader component 114 is an operating system component that executes in kernel level 104. Boot loader component 114 is typically loaded and verified by a firmware component 112 before being executed. Boot loader component 114 can be verified in different manners, such as by verifying a digital signature (generated by an entity that firmware component 112 is configured (e.g., programmed) to trust) of boot loader component 114.

Boot loader component 114 identifies protection component 116 as the initial component that boot loader component 114 is to execute. Protection component 116 is thus the initial or first component executed after executing boot loader component 114. Boot loader component 114 can identify protection component 116 in a variety of different manners.

In one or more embodiments, protection component 116 is digitally signed (by an entity that boot loader component 114 is configured (e.g., programmed) to trust). This digital signature can include certification (e.g., a digitally signed statement or certificate) that protection component 116 is a particular class of component, is associated with a particular trust level (e.g., a highest of multiple trust levels), is a particular type of component (e.g., anti-malware component) manufactured by a particular manufacturer, and so forth. Boot loader component 114 can use this certification to identify protection component 116. For example, boot loader component 114 can identify protection component 116 by identifying a component having a digital signature with a certification indicating that the component is a particular type of component manufactured by a particular one of one or more manufacturers. Alternatively, boot loader component 114 can identify protection component 116 in different manners, such as by identifying a component having a particular hash value, identifying a component stored at a particular location in protected nonvolatile memory, and so forth.

Protection component 116 operates to assist in the protection of device 100 from malicious programs. Protection component 116 can, for example, protect an operating system kernel from malicious programs. In one or more embodiments, protection component 116 is an anti-malware component or program (e.g., an anti-virus and/or and-spyware component or program) that uses a variety of different techniques to identify malicious programs.

Protection component 116 identifies one or more requested components and determines whether each of the one or more requested components is to be executed in device 100. The requested components refer to components that have been indicated by another component, module, or device as to be executed. However, such requested components are not executed until approved by protection component 116. In one or more embodiments, protection component 116 identifies one or more requested boot critical components, and determines whether each of the one or more requested boot critical components is to be executed as a boot critical component 122. A boot critical component refers to a component that is needed in order for the operating system to boot on device 100. Some components are optional and if not executed the boot process can still complete and the operating system run on device 100 (although the functionality provided by the component that is not executed is not available). Other components, however, are boot critical components and without the boot critical components the boot process cannot complete correctly and the operating system cannot run on device 100.

In one or more embodiments, boot loader component 114 loads boot critical components 122 into memory of device 100 and invokes protection component 116 to approve the loaded boot critical components 122 for execution. Although boot critical components 122 are loaded into memory of device 100, boot critical components 122 are not executed until approved for execution by protection component 116. After being approved for execution by protection component 116, boot loader component 114 can execute the approved boot critical components 122. If boot critical component that has been loaded into memory of device 100 is not approved by protection component 116, then boot loader component 114 unloads such an unapproved boot critical component from memory of computing device 100.

Although discussions are included herein in which the component identified by protection component 116 are boot critical components, alternatively protection component 116 can identify other types of requested components and determine whether each of such other types of requested components is to be executed in device 100. For example, protection component 116 can determine whether boot components (regardless of whether the boot components are boot critical) are to be executed in device 100, whether other operating system components are to be executed in device 100, and so forth.

The requested one or more boot critical components can be identified in different manners. In one or more embodiments, a list of requested boot critical components is obtained by protection component 116 from a storage device (e.g., a disk or Flash memory of device 100) or from boot loader component 114. This list can be a list having a particular name, a list stored in a particular folder or location, and so forth. This list is typically provided by, for example, an operating system manufacturer or vendor, and is the list of boot critical components that the operating system manufacturer or vendor requests be executed as boot critical components 122. Protection component 116 retrieves this list of requested boot critical components and determines whether to execute each boot critical component on the list as a boot critical component 122.

Protection component 116 determines whether the requested boot critical components are approved for execution based at least in part on a load policy 118 and/or a list of approved components 120. Load policy 118 is stored on computing device 100, and is typically obtained by computing device 100 from a remote device or service (e.g., accessed via the Internet or other network). For example, if protection component 116 is an anti-malware program, load policy 118 can be obtained from the manufacturer or vendor of the anti-malware program (or another trusted third party). Protection component 116 (or alternatively boot loader component 114) verifies that load policy 118 is from a trusted entity (e.g., was digitally signed by an entity that protection component 116 is configured (e.g., programmed) to trust).

Load policy 118 includes one or more of various criteria that can be used by protection component 116 to determine whether to approve a requested component for execution as a boot critical component 122. Protection component 116 evaluates the requested component based on these criteria, and determines based on the evaluation whether the requested component is approved for execution as a boot critical component 122. The criteria included in load policy 118 can include component-specific criteria, such as one or more of a list of identifiers (e.g., hash values) of components that are approved for execution, a list of identifiers (e.g., hash values) of components that are not approved for execution, and so forth. The criteria included in load policy 118 can also include broader criteria to be applied, such as one or more of particular heuristics to apply to determine whether a component is approved for execution, a list of manufacturers or vendors whose components are approved for execution, a list of manufacturers or vendors whose components are not approved for execution, particular instructions or data that cannot be present in a component in order to approve the component, particular patterns that cannot be present in a component in order to approve the component, and so forth.

In one or more embodiments, load policy 118 includes one or more of various criteria that can be used by protection component 116 to determine whether to approve a requested component for execution as a boot critical component 122. A separate load policy (not shown) includes one or more of various criteria that can be used by protection component 116 (or another component) to similarly determine whether to approve a particular component for execution as an additional operating system component 124 and/or a user mode component 126. Alternatively, load policy 118 includes one or more of various criteria that can be used by protection component 116 to determine whether to approve a requested component for execution as a boot critical component 122, as an additional operating system component 124, and/or as a user mode component 126.

Approved list 120 is a list of components that have been approved for execution by protection component 116 based on load policy 118. Approved list 120 includes a list of identifiers (e.g., hash values) of components that have previously been evaluated and approved for execution by protection component 116. Approved list 120 can also include an indication (e.g., version number, timestamp, etc.) of the load policy 118 that was used in evaluating and approving the components in approved list 120. Approved list 120 can also optionally include additional information, such as a list of identifiers (e.g., hash values) of components that were previously evaluated and not approved for execution by protection component 116. Approved list 120 is stored in a tamper-proof manner that prevents approved list 120 from being tampered with by a malicious program and/or that allows any tampering with approved list 120 to be detected as discussed in more detail below.

Alternatively, approved list 120 can include the approved components themselves rather than identifiers of the components.

Including an indication of the load policy 118 that was used in evaluating and approving the components in approved list 120 is used as a record keeping mechanism. The indication allows a user or administrator of device 100 to determine a particular version of a load policy that was in place at the time approved list 120 was created. This indication can also be provided (e.g., after receiving permission from a user of device 100 to do so) to a remote system or service, such as to allow an operating system manufacturer or protection component manufacturer to analyze and attempt to improve the performance of the operating system and/or protection component. Alternatively, no such indication of the load policy 118 that was used in evaluating and approving the components in approved list 120 need be maintained, or can be maintained separately from load policy 118.

Approved list 120 allows boot critical components to be evaluated once by protection component 116 and after being approved a record of their approval maintained. During subsequent boots of device 100, the boot critical components identified in approved list 120 need not be re-evaluated based on load policy 118. Rather, the boot critical components identified in approved list 120 can be approved by protection component 116 without being re-evaluated based on load policy 118.

It should be noted that load policy 118 can change over time. Load policy 118 is typically updated when new malicious programs or new criteria for identifying malicious programs are identified (e.g., by an anti-malware program manufacturer or other third party), and thus load policy 118 can change relatively frequently (e.g., multiple times per day). Changes to load policy 118 are obtained by a component of device 100 (e.g., protection component 116 or another component in kernel level 104), and replace a previous load policy 118 or modify a previous load policy. Protection component

116 verifies that changes to load policy 118 are obtained from a trusted entity (e.g., the changes were digitally signed by an entity that protection component 116 is configured (e.g., programmed) to trust). Protection component 116 can determine the differences between the changed load policy 118 and the previous load policy in different manners, such as being specified in the changed load policy 118, by comparing the two load policies, and so forth.

A changed load policy 118 may or may not affect approved list 120. In situations where the changes to load policy 118 is a list of identifiers of components that are approved for execution and/or a list of identifiers of components that are not approved for execution, then protection component 116 identifies which components have been changed (e.g., which components are no longer approved for execution). If the changed load policy does not include a change to a component that is on approved list 120, then approved list 120 remains valid (unaffected by the change) and can continue to be used by protection component 116 in determining whether to approve boot critical components for execution.

However, if the changes to load policy 118 include heuristics or other broader criteria that is not maintained in approved list 120, then approved list 120 is affected by the change. Accordingly, approved list 120 is deleted (effectively invalidating the approved list) and a new approved list 120 is generated by evaluating whether the requested boot critical components satisfy the changed load policy 118. For example, assume a newly received changed load policy 118 includes a new criteria that components from a particular manufacturer are not approved for execution. If approved list 120 includes an indication of the manufacturers of the components in approved list 120, then approved list 120 can still be used if none of the manufacturers of the components in approved list are that particular manufacturer. However, if approved list 120 does not include an indication of the manufacturers of the components in approved list 120, then a new approved list 120 is generated by evaluating the changed load policy 118.

For each requested boot critical component, protection component 116 determines whether the boot critical component is included in approved list 120. This determination can be made, for example, by generating a hash value of the requested boot critical component and checking whether the generated hash value is included in approved list 120. If the requested boot critical component is included in approved list 120, then the requested boot critical component is approved for execution as a boot critical component 122.

For each requested boot critical component that is not included in approved list 120, protection component 116 checks whether the requested boot critical component satisfies load policy 118. A requested boot critical component satisfies load policy 118 if evaluation of the requested boot critical component by protection component 116 based on the criteria in load policy 118 indicates that the requested boot critical component is approved for execution as a boot critical component 122. Protection component 116 also optionally adds an identifier of the newly approved boot critical component to approved list 120.

Boot loader component 114 loads the boot critical components, but initiates execution of the boot critical components as boot critical components 122 only after approval of the boot critical components for execution by protection component 116. If a requested boot critical component that has been loaded is not included in approved list 120 and does not satisfy load policy 118, the requested boot critical component is not approved for execution as a boot critical component 122. Boot loader component 114 does not execute a boot critical component that is not approved for execution as a boot critical component 122, and unloads such an unapproved boot critical component from memory of computing device 100.

Alternatively, boot loader component 114 can invoke protection component 116 before loading boot critical components 122 into memory of device 100. In such situations, protection component 116 evaluates whether to approve each of the requested boot critical components as discussed herein, but boot critical components 122 are loaded into memory of device 100 only after being approved for loading (and thus also inherently approved for execution) by protection component 116. In other embodiments, loading and/or executing of boot critical components 122 can be performed by protection component 116 rather than boot loader component 114.

In one or more embodiments, protection component 116 makes the determination of which boot critical components are approved for execution, but delays informing boot loader component 114 of the approved boot critical components. Protection component 116 delays informing boot loader component 114 of the approved boot critical components until approved list 120 is stored in a manner that prevents approved list 120 from being tampered with by a malicious program and/or that allows any tampering with approved list 120 to be detected. By delaying informing boot loader component 114 of the approved boot critical components, protection component 116 knows that execution of the boot critical components 122 is also delayed and thus that a boot critical component 122 (or any later executed component) is prevented from tampering with approved list 120 and/or that any tampering with approved list 120 can be detected.

After boot critical components 122 are executed one or more additional operating system components 124 and/or one or more user mode components 126 can be executed. A variety of different operating system components 124 and/or user mode components 126 can be executed. Operating system components 124 and user mode components 126 can be executed in response to a user request to execute a component 124 or 126 or in response to a request from another component or module. It should also be noted that a previously executing component, such as protection component 116, can prevent an additional operating system component 124 and/or user mode component 126 from executing. For example, if protection component 116 is an anti-malware program and determines that a particular additional operating system component 124 or user mode component 126 is a malicious program (e.g., by determining whether the component 124 or 126 satisfies load policy 118), then that component 124 or 126 is not executed.

Device 100 is illustrated as including a boot loader component 114 and a protection component 116. Alternatively, boot loader component 114 and protection component 116 can be combined into a single boot and protection component. Firmware components 112 initiate execution of this single boot and protection component, analogous to initiating execution of boot loader component 114 discussed above. However, rather than having boot loader component 114 execute protection component 116, this single boot and protection component approves boot critical components for execution and also executes the boot critical components that are approved for execution.

As indicated above, approved list 120 is protected against tampering by being stored in a manner that prevents approved list 120 from being tampered with by a malicious program and/or that allows any tampering with approved list 120 to be detected. Approved list 120 can be protected against tampering in a variety of different manners.

Figure 2:
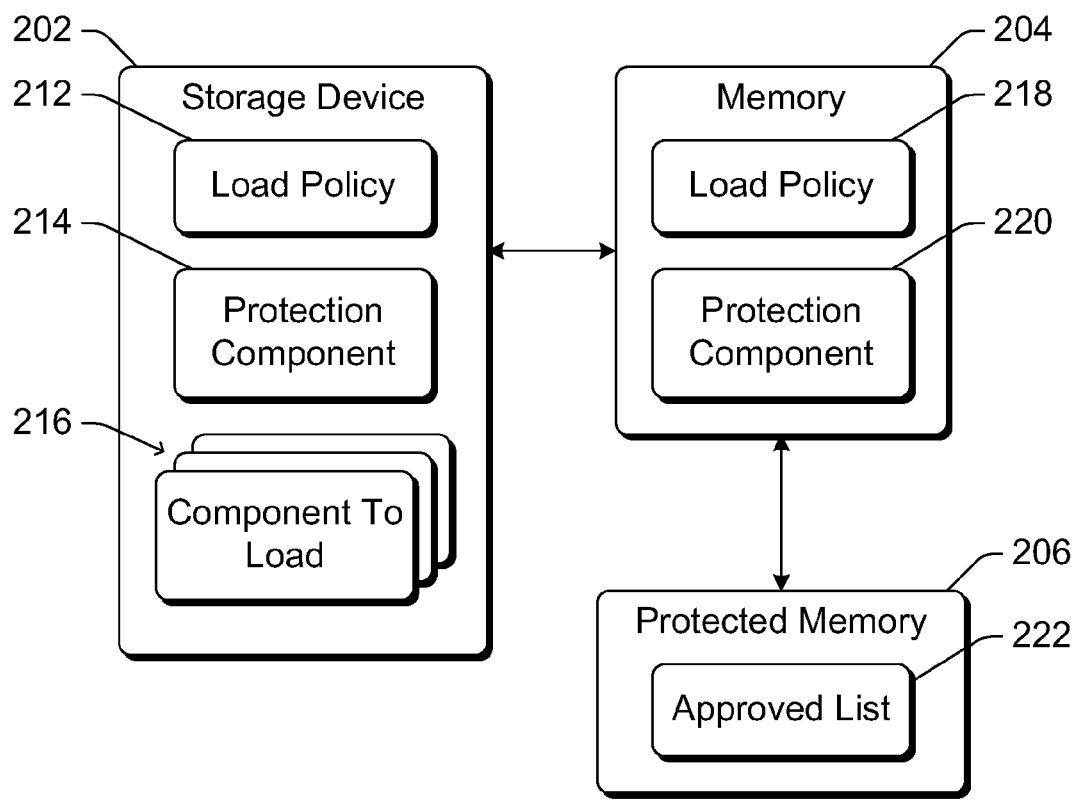
FIG. 2 is a block diagram illustrating an example memory structure supporting the device booting with an initial protection component in accordance with one or more embodiments.

FIG. 2 is a block diagram illustrating an example memory structure 200 supporting the device booting with an initial protection component in accordance with one or more embodiments. Memory structure 200 facilitates protecting approved list 120 against tampering. Memory structure 200 includes a storage device 202, a memory 204, and a protected memory 206. Storage device 202 can be a variety of different nonvolatile memory or storage devices such as Flash memory, read only memory (ROM), magnetic disk, optical disc, and so forth. Memory 204 can be a variety of different volatile memory devices, such as RAM. Storage device 200 includes a load policy 212 (which can be a load policy 118 of FIG. 1), a protection component 214 (which can be a protection component 116 of FIG. 1), and one or more components to load 216 (which can be components 122, 124, and 126 of FIG. 1). During the boot process, load policy 212 is loaded into memory 204 as load policy 218, and protection component 214 is loaded into memory 204 as protection component 220 as discussed above with reference to FIG. 1. One or more components to load 216 can also optionally be loaded into memory 204.

Protected memory 206 is a writeable nonvolatile memory, such as nonvolatile RAM (NVRAM). Protected memory 206 can be accessed only under certain conditions and/or at certain times. In one or more embodiments, protected memory 206 is accessed via a Trusted Platform Module (TPM). Additional information regarding TPM is available from the Trusted Computing Group of Beaverton, Oreg. The TPM allows protected memory 206 to be read from and written to until a certain point in time or a certain event occurs, after which the TPM allows protected memory 206 to be read but not written. This certain point in time or event can be, for example, a request from a component to close or lock protected memory 206. Accordingly, protection component 220 can store approved list 222 (which can be approved list 120 of FIG. 1) in protected memory 206 and then have protected memory 206 locked. Protection component 220 can thus prevent a malicious program from tampering with approved list 222 because protected memory 206 is locked. Protected memory 206 is not unlocked until the device including memory structure 200 is booted again. Protected memory 206 is unlocked the next time the device is booted, but protection component 220 begins executing early in the boot process and locks protected memory 206 again before a malicious program would be able to execute and write to protected memory 206.

Alternatively, rather than storing approved list 222 in protected memory 206, an identifier of the approved list (e.g., an identifier of approved list 120 of FIG. 1) can be stored in protected memory 206. A list of identifiers (e.g., hash values) of components can be generated and stored on storage device 202. A hash value of this list can be generated by protection component 220 and stored in protected memory 206. The next time that the device including memory structure 200 is booted, during the boot process protection component 220 retrieves the list from storage device 202 and verifies that the hash value of the retrieved list matches (e.g., is the same as) the hash value in protected memory 206. If the hash value of the retrieved list matches the hash value in protected memory 206, then protection component 220 knows that the retrieved list has not been tampered with and thus can use the retrieved list as the approved list. However, if the hash value of the retrieved list does not match (e.g., is not the same as) the hash value in protected memory 206, then protection component 220 knows that the retrieved list has been tampered with or otherwise altered. Protection component 220 thus does not use the retrieved list as the approved list (e.g., deletes the retrieved list) and instead generates a new approved list (by evaluating whether the requested boot critical components satisfy the load policy as discussed above).

It should be noted that situations can arise where a new boot critical component is stored on the device and approved for execution as a boot critical component (e.g., as a boot critical component 122 of FIG. 1). In such situations, if approved list 222 is stored in protected memory 206 then protection component 220 adds an identifier of the new boot critical component to approved list 222. If, however, a hash value of a list of identifiers of components is stored in protected memory 206 rather than approved list 222, then protection component 220 adds an identifier of the new boot critical component to the list of identifiers stored on storage device 202, generates a new hash value based on the new list of identifiers, and stores the new hash value in protected memory 206. Alternatively, protection component 220 can store a separate list including an identifier of the new boot critical component (which may include an identifier of just the new boot critical component) on storage device 202, generate a hash value based on this separate list, and store the newly generated hash value in protected memory 206. Accordingly, protection component 220 would obtain multiple lists of identifiers of components from storage device 202 and compare hash values of those multiple lists to multiple hash values in protected memory 206.

Figure 3:
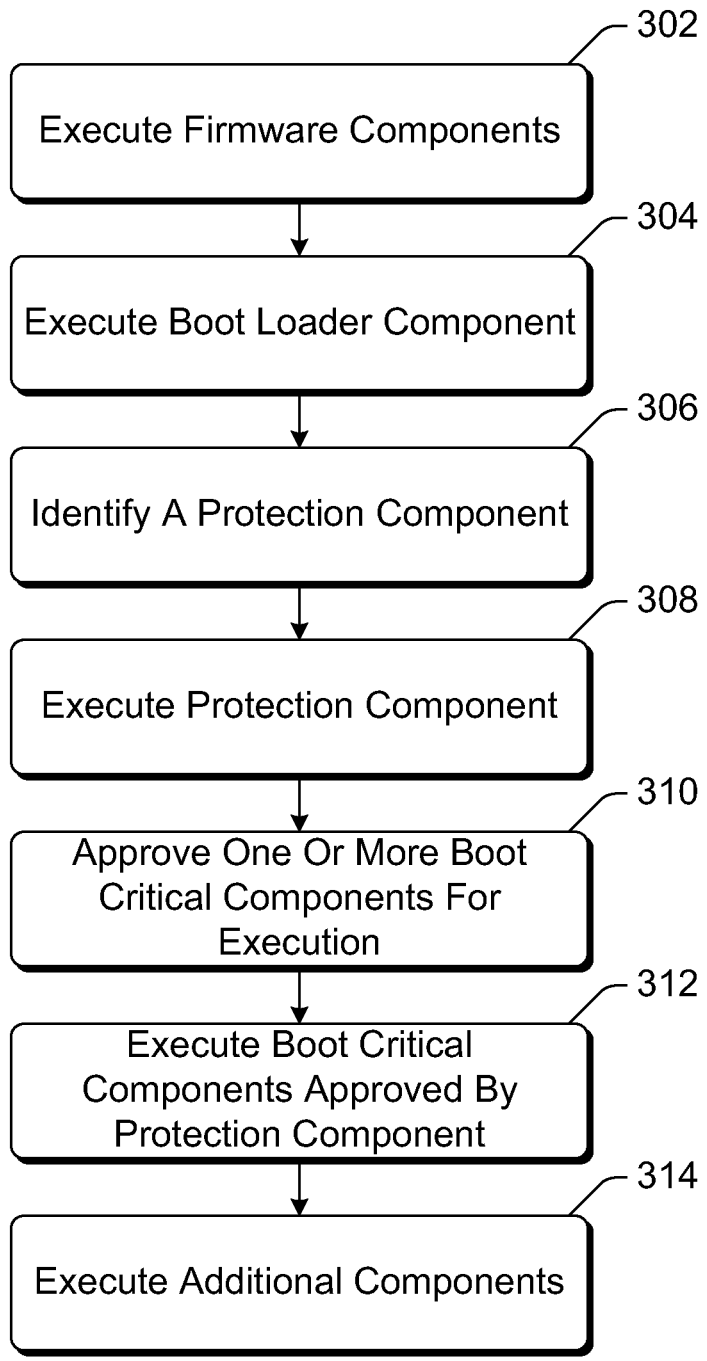
FIG. 3 is a flowchart illustrating an example process for booting a device in accordance with one or more embodiments.

FIG. 3 is a flowchart illustrating an example process 300 for booting a device in accordance with one or more embodiments. Process 300 is carried out by a device, such as device 100 of FIG. 1, and can be implemented in software, firmware, hardware, or combinations thereof. Process 300 is an example process for booting a device; additional discussions of booting a device are included herein with reference to different figures.

In process 300, one or more firmware components are executed (act 302). The firmware components execute a boot loader component (act 304). The firmware components can verify the boot loader component in different manners as discussed above.

The boot loader component then identifies a protection component (act 306) and executes the identified protection component (act 308). The protection component can be identified by the boot loader in a variety of different manners as discussed above. The protection component is, for example, an anti-malware program.

The protection component approves one or more boot critical components for execution (act 310). The boot critical components that are approved by the protection component for execution can be determined in different manners, such as based on a load policy and/or an approved list as discussed above.

The one or more boot critical components that are approved by the protection component for execution are executed (act 312). Boot critical components that are not approved by the protection component for execution are not executed (regardless of whether such unapproved components have already been loaded). These one or more boot critical components that are approved for execution can be loaded and executed by the boot loader component and/or the protection component.

One or more additional components are then executed (act 314). These one or more additional components are executed by a previously executed component, such as the protection component, a boot critical component, and so forth.

Figure 4:
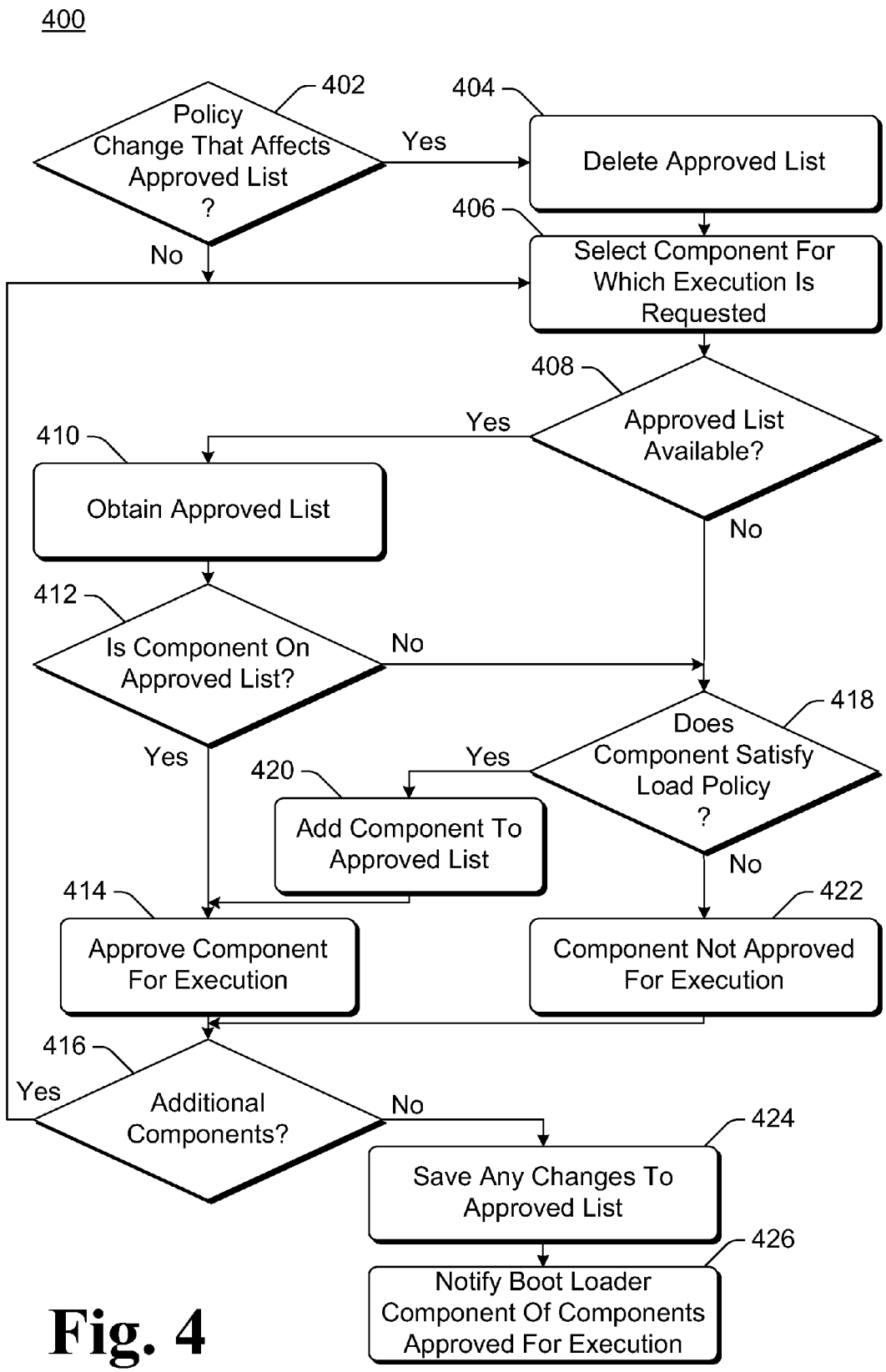
FIG. 4 is a flowchart illustrating an example process for approving one or more components for execution in accordance with one or more embodiments.

FIG. 4 is a flowchart illustrating an example process 400 for approving one or more components for execution in accordance with one or more embodiments. Process 400 is carried out by a protection component, such as protection component 116 of FIG. 1, and can be implemented in software, firmware, hardware, or combinations thereof. Process 400 is an example process for approving one or more components for execution; additional discussions of approving one or more components for execution are included herein with reference to different figures.

In process 400, a check is made as to whether a policy change affects an approved list (act 402). The approved list is a list of components that have been approved for execution, based on a load policy, by the protection component implementing process 400 as discussed above. Different changes to the load policy can be made, not all of which affect the approved list as discussed above. If a policy change affects the approved list, then the approved list is no longer valid and thus is deleted (act 404).

After the approved list is deleted, or if a policy change does not affect the approved list, then a component for which execution is requested is selected (act 406). Such components can be identified in different manners, such as by using a list of requested boot components as discussed above. These boot components can be boot critical components or alternatively other types of components as discussed above. These components can be selected in different manners, such as in accordance with their order in the list of requested boot components, randomly, according to some other rule or criteria, and so forth.

A check is made as to whether an approved list is available (act 408). No approved list can be available for different reasons, such as if the device has not been previously booted, if the approved list was deleted (e.g., due to a policy change or tampering with the list being detected), and so forth.

If the approved list is available, then the approved list is obtained (act 410). A check is made as to whether the component selected in act 406 is on the approved list (act 412). If the component is on the approved list, then the component is approved for execution (act 414). A temporary list of components that are approved for execution can be maintained by the protection component implementing process 400, and then provided to a boot loader component for execution of the approved components as discussed below.

A check is then made as to whether there are any additional components for which execution is requested (act 416). As discussed above, execution can be requested for multiple components. If there are additional components that have not yet been selected in act 406, then process 400 returns to act 406 to select one of the components that have not yet been selected.

Returning to act 408, if an approved list is not available, then a check is made as to whether the component satisfies the load policy (act 418). The load policy can include a variety of different criteria as discussed above.

If the component satisfies the load policy, then the component is added to the approved list (act 420). Process 400 then proceeds to act 414, where the component is approved for execution.

However, if the component does not satisfy the load policy, then the protection component implementing process 400 does not approve the component for execution (act 422). Process 400 then proceeds to act 416, where a check is then made as to whether there are any additional components for which execution is requested.

Proceeding with act 416, after all the requested components have been selected (e.g., all the components identified in a list of requested components have been selected), then any changes made to the approved list in process 400 are saved (act 424). This saving can also include locking or closing a protected memory, such as via a TPM as discussed above. The boot loader component is then notified of the components that were approved for execution in act 414 (act 426), and can in turn execute the components that were approved for execution by the protection component implementing process 400. Executing the loaded components after the approved list is saved prevents components executed in act 426 from tampering with the approved list. Alternatively, if other techniques are used to prevent the loaded components from tampering with the approved list, then the boot loader component can be notified of the components that are approved for execution, and can in turn execute such components, as they are approved (e.g., in act 414). In other embodiments, the protection component can execute the components that are approved for execution rather than the boot loader component as discussed above.

Thus, it can be seen that using the device booting with an initial protection component techniques discussed herein, the process of booting a device executes components in an order from more trusted to less trusted. Components that are more trusted refer to components that are more trusted by the device to be non-malicious programs than are less trusted components. For example, protection component 116 of FIG. 1 is more trusted than boot critical components 122 of FIG. 1, and thus is executed before boot critical components 122 when booting device 100 of FIG. 1.

Referring again to FIG. 1, multiple trust levels are inherent in the boot process used by device 100. For example, firmware components 112 are more trusted than boot loader component 114, boot loader component 114 is more trusted than protection component 116, protection component 116 is more trusted than boot critical components 122, and so forth. The particular trust level associated with components can be identified in various manners. For example, the trust level of a component can be inherent in an earlier executed component (e.g., by firmware components 112 being configured to identify a particular boot loader component 114). By way of another example, one or more components (e.g., components 116, 122, and 124) can be digitally signed by a trusted entity. The digital signatures for these components can include a certification that the component is associated with a particular trust level.

Additionally, in the discussions above boot loader component 114 is discussed as executing one or more boot critical components 122. The boot critical components 122 can be of the same trust level or alternatively different trust levels. For example, boot loader component 114 can execute a first set of more trusted boot critical components 122, and then a second set of less trusted boot critical components 122, and so forth.

The device booting with an initial protection component techniques discussed herein provide support a variety of different usage scenarios. For example, an anti-malware program begins executing early in the boot process. The anti-malware program can detect malicious programs that subsequently attempt to run and prevent those malicious programs from running. Furthermore, even if the situation arises where a malicious program evades detection and begins executing but is subsequently detected (e.g., due to an updated load policy), then the program will be detected by the anti-malware program and prevented from running the next time the device is booted. Given the early stage in the boot process at which the anti-malware program runs, a malicious program is not given an opportunity to begin running in computing device 100 before the anti-malware program.

Figure 5:
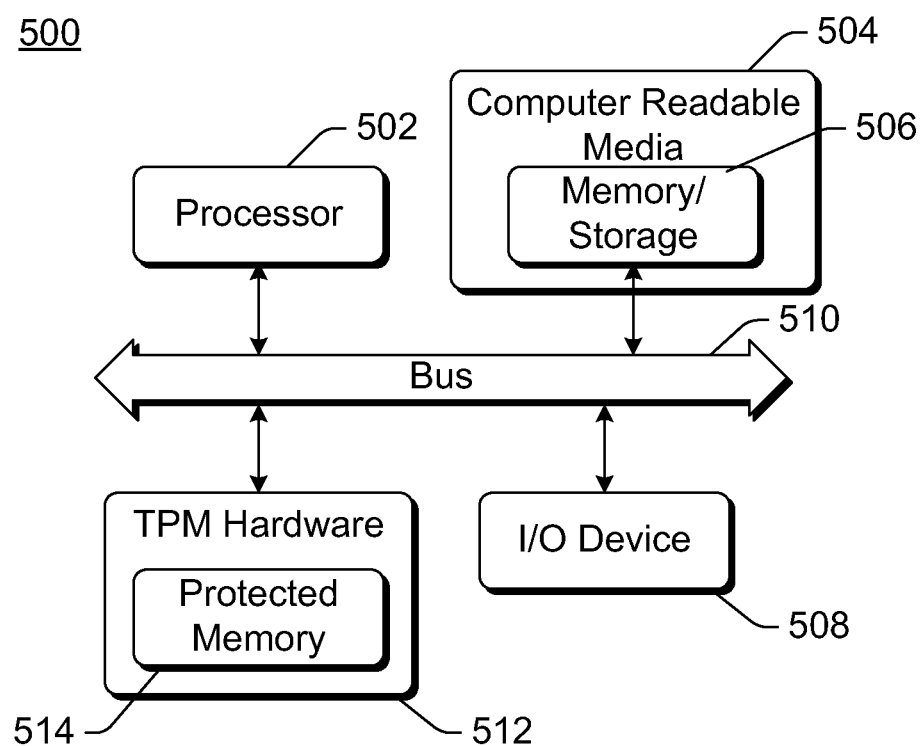
FIG. 5 illustrates an example computing device that can be configured to implement the device booting with an initial protection component in accordance with one or more embodiments.

FIG. 5 illustrates an example computing device 500 that can be configured to implement the device booting with an initial protection component in accordance with one or more embodiments. Computing device 500 can be, for example, computing device 100 of FIG. 1 or can implement, for example, memory structure 200 of FIG. 2.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or non-volatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth). Computing device 500 also optionally includes TPM hardware 512, which can include (and/or control access to) NVRAM or other protected memory 514.

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. The features of the device booting with an initial protection component techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of booting a computing device, the method comprising:
   executing one or more firmware components;
   executing, after executing the one or more firmware components, a boot loader component;
   identifying a protection component for the computing device;
   executing the protection component as an initial component after executing the boot loader component;
   accessing a list of previously approved boot components;
   approving one or more boot components before executing the one or more boot components based at least in part on the list of previously approved boot components;
   closing the list of previously approved boot components;
   informing the boot loader component of the approved one or more boot components after closing the list; and
   executing the approved one or more boot components.

2. A method as recited in claim 1, wherein the protection component comprises an anti-malware program.

3. A method as recited in claim 1, wherein the protection component is an initial component executed in a kernel mode of the computing device after the boot loader component is executed.

4. A method as recited in claim 1, wherein the one or more boot components comprise one or more boot critical components.

5. A method as recited in claim 1, wherein identifying the protection component comprises identifying a particular type of component manufactured by a particular manufacturer as the protection component.

6. A method as recited in claim 4, wherein the particular type of component comprises an anti-malware program from the particular manufacturer.

7. A method as recited in claim 4, wherein the particular type of component and the particular manufacturer are identified in a certification of a digital signature for the protection component having been generated by digitally signing the protection component by an entity trusted by the boot loader component.

8. A method as recited in claim 1, further comprising the protection program determining whether a boot component is approved for execution based at least in part on whether the boot component satisfies a load policy.

9. A method as recited in claim 1, further comprising:
   analyzing whether the one or more boot components satisfy a load policy;
   generating the list of approved boot components that satisfy the load policy; and
   storing the list in a manner that allows subsequent tampering with the list to be detected.

10. A method as recited in claim 9, further comprising identifying, a next time the computing device is booted, that each boot component in the list is approved for execution by the protection component without re-analyzing whether each boot component in the list satisfies the load policy.

11. A method as recited in claim 10, further comprising:
    receiving changes to the load policy;
    checking whether the changes to the load policy affect the list;
    deleting the list if the changes to the load policy affect the list; and
    identifying that each boot component in the list is approved for execution by the protection component without analyzing whether each boot component in the list satisfies the changes to the load policy if the changes to the load policy do not affect the list.

12. A method as recited in claim 9, wherein the list includes identifiers of each of the approved boot components and an identifier of a current version of the load policy at the time the list was generated.

13. A method as recited in claim 9, wherein storing the list comprises:
    generating a hash value of the list;
    storing the list on a storage device;
    storing the hash value in a protected memory; and
    locking the protected memory to prevent a program from writing to the protected memory.

14. One or more computer hardware storage media having stored thereon multiple instructions that, when executed by one or more processors of a computing device, cause the one or more processors to:
    identify a protection component for the computing device; and
    execute the protection component as an initial kernel level component when booting the computing device, the protection component being configured to:
    access a list of previously approved components;
    approve one or more boot components for execution on the computing device based at least in part on the list of previously approved components;
    close the list of previously approved components; and
    inform a boot loader component of the one or more boot components that were approved.

15. One or more computer hardware storage media as recited in claim 14, wherein the protection component comprises an anti-malware program.

16. One or more computer hardware storage media as recited in claim 14, wherein the multiple instructions comprise a boot loader component of the computing device.

17. One or more hardware computer storage media as recited in claim 14, wherein the one or more boot components comprise one or more boot critical components.

18. One or more computer hardware storage media as recited in claim 14, wherein to identify the protection component is to identify, as the protection component, a particular type of component manufactured by a particular manufacturer.

19. One or more computer hardware storage media as recited in claim 18, wherein the particular type of component and the particular manufacturer are identified in a certification of a digital signature for the protection component having been generated by digitally signing the protection component by a trusted entity.

20. A method of booting a computing device, the method comprising:
    executing one or more firmware components;
    executing, after executing the one or more firmware components, a boot loader component;
    identifying an anti-malware program for the computing device;
    executing the anti-malware program as an initial component after executing the boot loader component, the anti-malware program identifying whether each of one or more boot critical components for which execution is requested is approved for execution by determining, for each of the one or more boot critical components for which execution is requested, whether the boot critical component is included on an approved list of components that were previously determined to satisfy a load policy;
    closing the approved list of components;
    informing the boot loader component of the one or more boot critical components that were included in the approved list of components; and
    executing only boot critical components that have been approved by the anti-malware program.

* * * * *

UNITED STATES PATENT AND TRADEMARK OFFICE
CERTIFICATE OF CORRECTION

PATENT NO. : 8,417,962 B2
APPLICATION NO. : 12/813955
DATED : April 9, 2013
INVENTOR(S) : Mark F. Novak et al.

It is certified that error appears in the above-identified patent and that said Letters Patent is hereby corrected as shown below:

In the Claims:

Column 15, line 1, in Claim 6, delete "4" and insert -- 5 --, therefor.

Column 15, line 4, in Claim 7, delete "4" and insert -- 5 --, therefor.

Signed and Sealed this
Twenty-first Day of May, 2013

Teresa Stanek Rea
*Acting Director of the United States Patent and Trademark Office*